L. A. BUTTERFIELD.
FERTILIZER SOWER.
APPLICATION FILED FEB. 13, 1914.
1,172,005.  Patented Feb. 15, 1916.
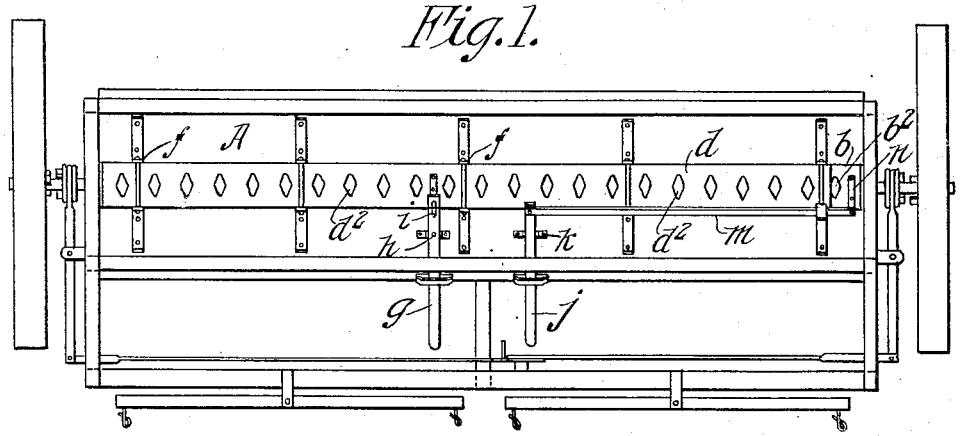
Fig. 1.
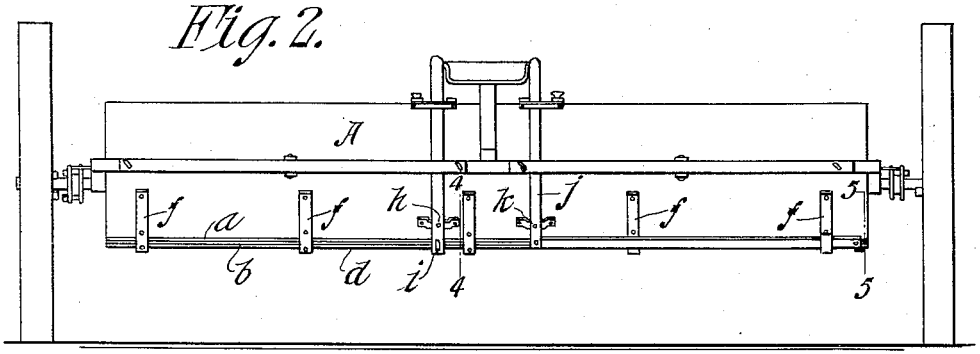
Fig. 2.
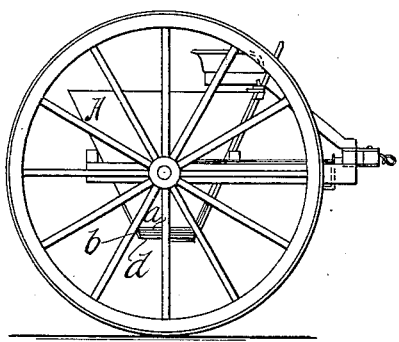
Fig. 3.
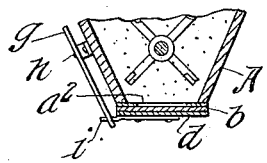
Fig. 4.
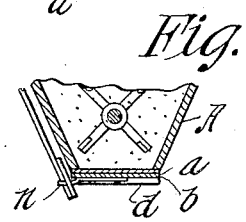
Fig. 5.
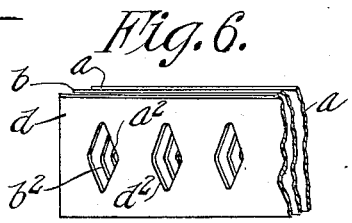
Fig. 6.
WITNESSES:
W. P. Noble.
B. A. Seaver.
INVENTOR,
Lewis A. Butterfield,
BY 
ATTORNEY.
THE COLUMBIA PLANOGRAPH CO., WASHINGTON, D. C.

UNITED STATES PATENT OFFICE.

LEWIS A. BUTTERFIELD, OF CHICOPEE, MASSACHUSETTS, ASSIGNOR TO BELCHER & TAYLOR AGRICULTURAL TOOL COMPANY, OF CHICOPEE FALLS, MASSACHUSETTS, A CORPORATION OF MASSACHUSETTS.

FERTILIZER-SOWER.

1,172,005.  Specification of Letters Patent.  Patented Feb. 15, 1916.

Application filed February 13, 1914. Serial No. 818,438.

*To all whom it may concern:*

Be it known that I, LEWIS A. BUTTERFIELD, a citizen of the United States of America, and resident of Chicopee, in the county of Hampden and State of Massachusetts, have invented certain new and useful Improvements in Fertilizer-Sowers, of which the following is a full, clear, and exact description.

This invention relates to a fertilizer distributer or sower of a class comprising a hopper, having a revoluble agitator therein and which hopper has at the bottom thereof two plates with apertures of corresponding size and uniformly spaced, one of the apertured plates being fixed, and serving as the bottom wall of the hopper, while the other is slidable so as to leave the openings of the full area or of only partial area, for copious or restricted discharge of the material as induced under the influence of the revoluble agitator.

The present invention contemplates the provision of a plate having apertures of size and spacing corresponding to those in the other plates and made slidable, with means for operating it so that when desired, as at a time when the machine is moving to or away from the field there can be a cut-off by the last named plate without changing the adjustment of the second plate.

It is to be appreciated that after, under the exercise of more or less care, an adjustment of the second apertured plate relatively to the fixed apertured bottom wall or first plate has been effected, if then such second plate is slid to act as the cut-off, a careless or indifferent farm hand will not at all times take the trouble to acquire the readjustment exactly as it had been before so that there may be a wasteful use of the fertilizer or a too scant distribution; and, therefore, by the additional independent apertured plate the latter may be used as a cut-off without disturbing the adjustment of the second or regulator plate.

The invention is described in conjunction with the accompanying drawings and is defined in the claims.

In the drawings:—Figure 1 represents a plan view of the fertilizer sower as seen inverted. Fig. 2 is a rear elevation of the machine; Fig. 3 is a side elevation; Figs. 4 and 5 are partial cross sectional views on lines 4—4 and 5—5, Fig. 2. Fig. 6 is a perspective view in representation of the fixed, adjustable and cut-off plate at the bottom of the hopper.

The hopper A is provided as the body of a wheeled carriage, and it has at the bottom thereof the plate $a$ provided with a plurality of spaced delivery openings $a^2$ which are of diamond shape with rounded corners or the shape of modified ellipses. This said plate forms the fixed bottom of the hopper, the opposite sides of which latter are downwardly convergent; $b$ represents the second plate which is adjustably movable relatively to the bottom forming plate $a$ having openings in spaced relation corresponding to those of the said plate $a$ and adapted to full or partially register therewith according to the position at which it is adjusted. Said plate $b$ is to be regarded as the feed plate, or regulator of the quantity of the fertilizer which may be caused or permitted to issue in a downward direction from the hopper.

The third plate $d$ is identical, practically, with the hopper-bottom forming plate $a$ and the regulator plate $b$, the apertures $d^2$ being of same size and having the same spaced relations as those $a^2$ and $b^2$ in the plates $a$ and $b$.

The plates $b$ and $d$ which are movable horizontally and endwise relatively to each other and to the hopper bottom $a$, are held in their facewise relation by the guides or keepers $f$ $f$ of a character heretofore usually employed in machines of this class.

The lowermost, cut-off plate $d$ has its longitudinal movement imparted thereto by a manually operable lever $g$ pivoted at $h$ on the side of the hopper and having an engagement with the lug $i$ which is extended transversely beyond the edge of the plate.

The plate $d$ is slightly shorter than the plates $a$ and $b$, as is shown in Fig. 1; and the means for the movement of the plate $b$ is shown to consist of the manually operable lever $j$ pivoted at $k$ on the side of the hopper near the middle thereof, and having connection by the link which is extended along parallel with the edges of the plates and has connection with the transversely extended lug $n$ provided on the under side of the regulator plate at the end portion thereof which is uncovered by the cut-off plate $d$.

The provisions herein described and shown, in the fertilizer distributing machine, additional to those which have been heretofore found in such machine, conduce greatly to the value of the machine and its capability for being employed for uniform and economical sowing of the fertilizer under any given adjustment of the regulator plate, and without the necessity of changing such adjustment (except as change thereof is desired and purposed) waste of the material at time of going through or away from the field being insured by the full moving to the aperture closing position of the cut-off plate $d$.

I claim:—

In a fertilizer distributer, a wheeled carriage, a hopper mounted on the carriage having downwardly convergent opposite sides and a horizontal bottom provided with a plurality of spaced delivery openings, a delivery controlling plate adjustably movable relatively to the bottom, having openings in spaced relations corresponding to those of the bottom, and adapted to fully or partially register therewith, and having an angularly extended lug at one end thereof, and a cut off plate, also having openings in spaced relations corresponding to those of the bottom and the controlling plate, in facewise contact against such plate, and adapted according to the positioning thereof, to have its openings in registry with those of such plate, and to have its openings entirely out of registry therewith, and terminating at one end within the end of the controlling plate, a lever pivotally mounted on an intermediate part of the hopper, and having an adjustment imparting connection with the cut off plate, another lever also pivotally mounted on an intermediate part of the hopper, and a link, connected to said lever, extending parallel with the said plates, and having a connection with the lug extended from the end portion of the controlling plate.

Signed by me at Springfield, Mass., in presence of two subscribing witnesses.

LEWIS A. BUTTERFIELD.

Witnesses:
W<small>M</small>. S. B<small>ELLOWS</small>,
G. R. D<small>RISCOLL</small>.